US011395022B1

(12) United States Patent
Chachare et al.

(10) Patent No.: US 11,395,022 B1
(45) Date of Patent: Jul. 19, 2022

(54) PASSENGER PREFERENCE BASED CONTENT DELIVERY IN COMMERCIAL PASSENGER VEHICLES

(71) Applicant: Panasonic Avionics Corporation, Lake Forest, CA (US)

(72) Inventors: Rahul Chachare, Lake Forest, CA (US); Victor Salov, Lake Forest, CA (US); Rita Chen, Lake Forest, CA (US)

(73) Assignee: PANASONIC AVIONICS CORPORATION, Irvine, CA (US)

( * ) Notice: Subject to any disclaimer, the term of this patent is extended or adjusted under 35 U.S.C. 154(b) by 0 days.

(21) Appl. No.: 17/338,609

(22) Filed: Jun. 3, 2021

(51) Int. Cl.
| | |
|---|---|
| *H04N 21/25* | (2011.01) |
| *H04N 21/214* | (2011.01) |
| *H04N 21/239* | (2011.01) |
| *G06N 20/00* | (2019.01) |
| *H04N 21/414* | (2011.01) |
| *H04N 21/475* | (2011.01) |
| *H04N 21/442* | (2011.01) |

(52) U.S. Cl.
CPC ........... *H04N 21/252* (2013.01); *G06N 20/00* (2019.01); *H04N 21/2146* (2013.01); *H04N 21/239* (2013.01); *H04N 21/41422* (2013.01); *H04N 21/44204* (2013.01); *H04N 21/4756* (2013.01)

(58) Field of Classification Search
CPC ............. H04N 21/252; H04N 21/2146; H04N 21/239; H04N 21/41422; H04N 21/44204; H04N 21/4756; G06N 20/00
See application file for complete search history.

(56) References Cited

U.S. PATENT DOCUMENTS

| 10,951,922 B1* | 3/2021 | Bates ............... H04N 21/47217 |
|---|---|---|
| 2013/0054375 A1 | 2/2013 | Sy et al. |
| 2013/0073388 A1 | 3/2013 | Heath |

(Continued)

FOREIGN PATENT DOCUMENTS

| CN | 104361502 A | 2/2015 |
|---|---|---|
| WO | 2014072931 A1 | 5/2014 |

OTHER PUBLICATIONS

Mehta, R. M., "A Prediction Model of Airline Passenger Preference: Identifying Factors That Predict Passenger Preference Between Low Cost and Legacy Carriers," Dissertation submitted to College of Aeronautics Florida Institute of Technology, Sep. 2017.

*Primary Examiner* — Oschta I Montoya
(74) *Attorney, Agent, or Firm* — Perkins Coie LLP

(57) ABSTRACT

Vehicle entertainment systems can determine an entertainment preference of a passenger based on the interactions of the passenger with media devices on board the vehicle. The interactions can include how the passenger rates content, whether the passenger views the entirety of the content, or information regarding the passenger such as frequent flier data. The analysis to determine the preferences of the passenger are done without placing cookies on the passenger's devices and by components on board the vehicle. The analysis can include machine learning techniques that build trained models of passenger preferences. Additionally, the trained models can develop profiles for each passenger. At the end of the travel experience, the preferences of a passenger can be deleted such that a new passenger does not see content that was based on the prior passenger's preferences.

20 Claims, 8 Drawing Sheets

(56) References Cited

U.S. PATENT DOCUMENTS

| | | |
|---|---|---|
| 2016/0286258 A1 | 9/2016 | Rajagopal et al. |
| 2017/0032402 A1* | 2/2017 | Patsiokas ............ G06Q 30/0207 |
| 2017/0048664 A1 | 2/2017 | Zhang et al. |
| 2017/0358022 A1* | 12/2017 | Deak ................... G06Q 30/0631 |
| 2018/0053121 A1 | 2/2018 | Gonzalez et al. |
| 2018/0234707 A1* | 8/2018 | Pujia ................... H04N 21/4227 |
| 2019/0014371 A1* | 1/2019 | Couleaud ............. H04N 21/426 |
| 2020/0130703 A1* | 4/2020 | Pendelton .............. A61B 5/165 |
| 2020/0221184 A1 | 7/2020 | Skliba et al. |
| 2022/0074756 A1* | 3/2022 | Gewickey .......... G01C 21/3644 |

\* cited by examiner

PASSENGER PREFERENCE BASED CONTENT DELIVERY IN COMMERCIAL PASSENGER VEHICLES

TECHNICAL FIELD

This application is related to delivering content to passengers on commercial vehicles, and more particularly, to delivering passenger preference based content.

BACKGROUND

Commercial travel has evolved to provide entertainment options to passengers traveling to their destinations. For example, in an airplane or train, entertainment options are provided on monitors located on the back of seats, where the monitors can enable passengers to watch movies or television shows as they travel to their destinations. The monitors can also provide travel related information to the passengers. For example, passengers can view a map with the current location of the airplane or train and an estimated time of arrival to their destinations. Thus, in-vehicle entertainment systems can be designed to provide passengers with a positive travel experience.

BRIEF DESCRIPTION OF THE DRAWINGS

The techniques introduced here may be better understood by referring to the following Detailed Description in conjunction with the accompanying drawings, in which like reference numerals indicate identical or functionally similar elements.

DETAILED DESCRIPTION

Figure 1:
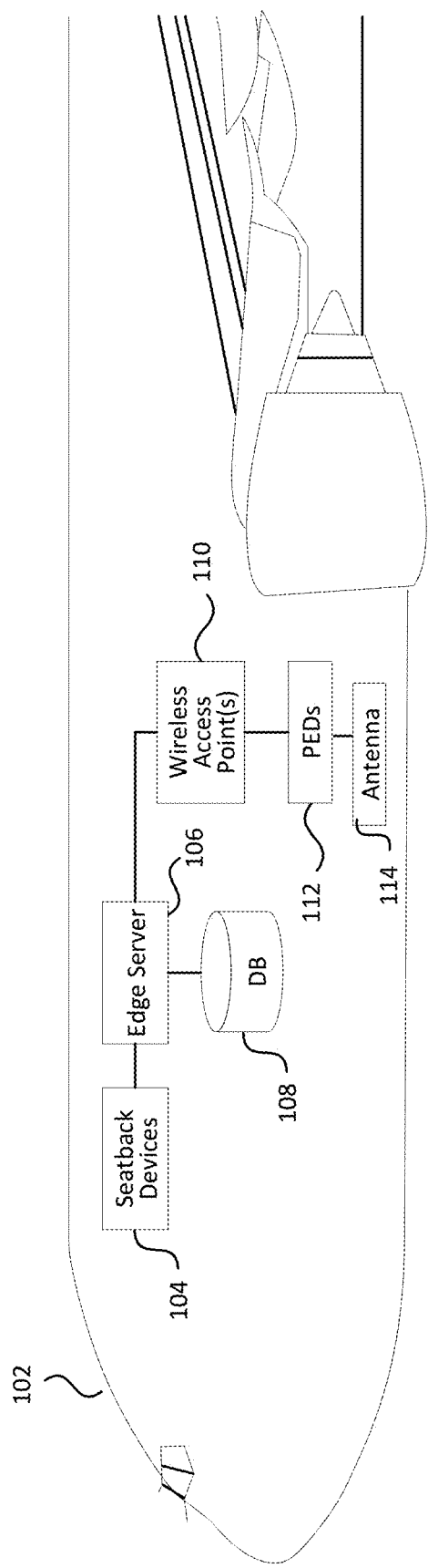
FIG. 1 shows an exemplary airplane with an entertainment system installed.

Currently, airplanes or other commercial vehicles use conventional in-vehicle entertainment systems to broadcast audio or video content to seatback devices located on the rear of the seat or to personal electronic devices (PEDs) (e.g., smartphone, laptops, or tablets) that belong to passengers. The audio or video content may include movies, television shows, or other content such as advertisements or flight safety video. Each seatback device has an enclosure that can have a processor executing custom software programs to receive messages or commands from an edge server and to display visual content on a display of the seatback device and to output sound to a headphone jack. Conventional in-vehicle entertainment systems can also wirelessly transmit audio or video content to PEDs that belong to passengers.

Conventional in-vehicle entertainment systems have several technical drawbacks, a few of which are discussed herein. Generally, the problems arise from the desire better the travel experience of passengers. First, the audio or video content transmitted by conventional in-vehicle entertainment systems to seatback device and/or PEDs does not frequently change. For example, the audio or video content stored on a server in the vehicle is usually updated once a month in part because the audio or video content is not dependent on the passengers' preferences. Thus, in the above example, an airplane having a conventional in-vehicle entertainment system may present to its passengers the same audio or video content over a course of a month.

Second, the in-vehicle entertainment systems are designed to provide all passengers traveling on a same airplane or ship with the same set of audio or video content. Thus, conventional in-vehicle entertainment systems present a same limited set of options to passengers to watch or listen to a limited set of audio or video content. For instance, irrespective of the passenger's preferences (e.g., language, genre), the audio and video content are the same.

Third, conventional in-vehicle entertainment systems are not designed to account for passenger preference related information that can be available from external sources (e.g., social media) or prior to the flight (e.g., frequent flier status). Thus, similar to the issues discussed above, by not accessing information related to a passenger from a variety of sources, the passenger is presented is generic audio and video content. Similarly, and fourth, conventional in-vehicle entertainment systems do not request passenger feedback nor take into account passenger feedback when presenting audio and visual content.

Lastly, conventional in-vehicle entertainment systems are configured to communicate frequently with ground systems or satellites (e.g., servers) to analyze and obtain data. For instance, an entertainment system onboard an airplane is updated with new instructions and new content when the airplane is, for example, at a terminal or while being wirelessly connected to a satellite. Thus, over-the-air updates may occur often, such as when there is a wireless connection to a ground system or satellite.

Accordingly, this application describes a commercial passenger vehicle entertainment system to overcome at least the above described technical drawbacks with conventional in-vehicle entertainment systems. In particular, introduced herein is a commercial passenger vehicle entertain system that provides passenger preferences based content to the passenger.

The example headings for the various sections below are used to facilitate the understanding of the disclosed subject matter and do not limit the scope of the claimed subject matter in any way. Accordingly, one or more features of one example section can be combined with one or more features of another example section.

This patent document describes the exemplary vehicle entertainment systems in the context of a commercial passenger vehicle such as an airplane for ease of description. The exemplary vehicle entertainment systems could be employed in other types of commercial passenger vehicle such as a train, a ship, or a bus.

Environment

FIG. 1 shows an exemplary vehicle entertainment system 100 installed in an airplane 102. The vehicle entertainment system 100 includes an edge server 106 (or head-end server)

located in the airplane 102. The edge server 106 is communicably coupled to the seatback devices 104 and personal electronic devices (PEDs) 112 to provide multimedia contents (e.g., audio, video, image, webpage, etc.) to the seatback devices 104 and/or PEDs. For example, the edge server 106 includes a content module (shown as 710 in FIG. 7) that may send multimedia contents to seatback devices 104 via an Ethernet switch, and the content module may send multimedia contents to PEDs 112 via one or more wireless access points 110. The content module of the edge server 106 can send a list of multimedia contents to be displayed on a graphical user interface (GUI) of the seatback devices 104 and/or the PEDs 112.

Based on a passenger's preference, a particular multimedia content can be selected by the edge server 106 for display on setback devices 104. A seatback device and/or a PED can be considered a media playback device at least because the seatback device or a PED can display or play the multimedia content. The seatback devices 104 and PEDs 112 can include appropriate audio or video codecs stored thereon to play the multimedia contents provided by the edge server 102 or another device (e.g., media hard drive) located onboard the airplane 102.

In some embodiments, the edge server 106 is in communication with the seatback device 104 and PEDs 112 to obtain data regarding the preference of a passenger. For example, the seatback device 104 can prompt a passenger to rate a multimedia content or provide the option to skip viewing the multimedia content. And, based on the rating the edge server 106 can determine a preference of the passenger. The preference can be, for example, whether the passenger would prefer to view similar multimedia content. In another example, if the user decides to skip viewing the multimedia content, the edge server 106 can determine that the user does not prefer to view similar multimedia content. As such, the edge server 106 can communicate with the seatback devices 104 and/or PEDs 112 to determine a preference of the passenger.

In some cases, the edge server 106 can be pre-loaded with a prediction of passenger preference. The edge server 106 can advantageously obtain from a ground server information about passengers so that the edge server 106 can, based on such information, provide customized entertainment options to passengers. For example, when the airplane 102 is waiting at an airport to board passengers or while the passengers are boarding the airplane 102, the edge server 106 can obtain from the ground server a list of predicted preferences about passengers that are located in or are expected to board the airplane. The ground server 116 may store the list of predicted preferences for the passengers in a database 108. The database 108 can be stored in the ground server. In addition, the edge server 106 can be in communication with a ground server through satellites (for example, when at high altitude, flying over a body of water, or area where there is limited signaling from the ground) via an antenna 120.

The list of passenger preferences may include information about passengers that may have been collected by the airlines and/or by a third-party (e.g., a social media platform). A list of passenger preferences may include a table that contains the names of each passenger that is expected to board the airplane 102, one or more predicted entertainment preferences for each passenger, and optionally seat number assigned to each passenger. One or more predicted entertainment preferences for a passenger may include any one of or more of the following entertainment categories preferred by the passenger: movies, music, television shows, on-line training classes (e.g., Udemy, Codecademy, edx, Coursera, Skillshare, Udacity, and the like), and news content (e.g., business, sports, politics, stock prices). The list of passenger preferences for a passenger may include additional or alternative entertainment categories derived based on an analysis of the passenger's personal information (e.g., career or age) and/or based on overall entertainment related trends from prior passengers who have travelled on the same or similar travel route.

The edge server 106 can include a passenger module that can obtain the list of passenger preferences from the ground server and/or obtain the passenger preferences from the analysis by the edge server 106. The passenger module can send to the content module the seat numbers of the passengers and the associated one or more predicted entertainment preferences of the passengers so that the content module can send commands or messages to the appropriate seatback devices 104 to display entertainment options tailored to the passengers. For example, if a high rating by a passenger indicates that the passenger enjoys western movies and football, the content module can send a command to the seatback device located in front of the passenger to display information about one or more western movies (if one or more western movies are stored on the edge server 106 and/or database 108) and to display football related news. A seatback device 104 can display on a GUI information about one or more entertainment options based on the one or more predicted entertainment preferences of the passenger that sits behind and operates that seatback device. The edge server 106 can store the data indicative of passenger preferences in the database 108. The database 108 can be stored in the edge server 106.

In some embodiments, the edge server 106 can determine the passenger preferences based on the passenger's interactions (e.g., rating, skipping of content) with the PEDs 112 and/or the seatback devices 104. Further, the edge server 106 can rely on multiple sources to determine the preference. For example, the edge server 106 (including content module) can send commands to a PED 112 associated with the passenger that interacted with the PED 112 to provide a rating, to show entertainment content based on the rating. For example, when a passenger first starts using his or her PED on the airplane 102, the passenger may enter his or her seat number or name via the GUI on the PED, and the PED can send such information along with the PED's identifier (e.g., MAC address or IP address) to the passenger module of the edge server 106. Based on the received seat number or name of the passenger and the obtained list of passenger preferences, the passenger module can associate one or more predicted entertainment preferences of the passenger with the PED operated by the passenger. The passenger module can send the one or more predicted entertainment preferences and the associated PED identifiers to the content module.

Over time (e.g., the duration of the travel), rather than relying on the list of passenger preferences, the edge server 106 can prompt the PED 112 to interact with the passenger. Based on the interactions, the edge server 106 can update the multimedia content being shown. In other words, the list of passenger preferences can determine the multimedia content that is played when the passenger first boards the vehicle. Over time, as the passenger interacts with the PEDs, more data indicative of the passenger's preference is obtained by the edger server 106. The edge server 106 can, then, provide updated multi media content.

For instance, a seatback device or PED can obtain from a passenger a request to display an entertainment option based on the one or more predicted entertainment preferences.

Continuing with the example described above, based on a message received from the content module to show one or more entertainment options, the seatback device or PED can present on a GUI selectable icons for one or more western movies and football related news. The selectable icons may be designed to allow the passenger to select a movie to be played or to read or watch news related to football. When a passenger selects an entertainment option, the seatback device or PED can send to the edge server 106 a message that includes the selected entertainment option so that the edge server 106 can provide or enable the selected content to be displayed on the seatback device or PED. The passenger module of the edge server 106 stores the list of passenger preferences in the database 108. Thus, the passenger module can update the predicted entertainment preferences stored in the database 108 for a passenger based on the passenger selected entertainment option received in the message from a seatback device.

As mentioned above, in some embodiments, the selectable icons on the GUI can also enable a passenger to indicate whether he or she prefers the displayed entertainment options. In an example implementation, a selectable icon for a displayed entertainment option include one or more selectable passenger preference indicators such as a "like" and/or "dislike" button(s) displayed adjacent to (e.g., top or bottom of) the selectable icon. If a seatback device or PED receives indications via its GUI that a passenger "likes" a western movie and "dislikes" another western movie, the seatback device or PED can send to the passenger module of the edge server 106 a message that includes such updated preferences. In another example implementation (as shown FIG. 5B), a star rating system can be used to determine the preference. Since the passenger module stores the list of passenger preferences in the database 108, the passenger module can update the predicted entertainment preferences stored in the database 108 for a passenger based on the one or more updated preferences received in the message from a PED.

The edge server 106 can update the one or more predicted entertainment preferences of passengers stored in the database 108 based on receiving messages that indicate whether passengers have selected entertainment options to be displayed or whether passengers have provided updated preferences. In some embodiments, the edge server 106 can update the list of passenger preferences in-flight based on entertainment related selections indicated by the passengers. The edge server 106 may transmit to the ground server 116 via the antenna 114 the updated list of passenger preferences so that the ground server 116 can update the list of passenger preferences stored on database 118. For example, after the airplane 102 has landed at its destination, the edge server 106 may transmit the updated list of passenger preferences to the ground server 116. In some embodiments, the edge server 106 can transmit the updated entertainment preference of one or more passengers to the ground server 116 so that the ground server 116 can update the list of passenger preferences stored on the database on the ground.

Accordingly, the components of FIG. 1 obtain passenger preferences (e.g., from a list and/or through passenger interactions) and provide passenger preference based content to the seatback device and/or PED associated with the passenger. As mentioned above, a predicted preference list of one or more passengers can be obtained from a ground server. For example, when an airplane is at a terminal, the airplane can communicatively couple to the ground server to receive the preference list. The preference list can be based on, for example, prior travel, social media, etc. Additionally or alternatively, a passenger's preferences can be determined during the travel time, as the passenger interacts with an associated seatback device and/or PED. For instance, the passenger can be prompted to rate a multimedia content and/or given an option to skip viewing the multimedia content. Based on these interactions, the edge server 106 can determine the preferences of the passenger.

Determining Passenger Preference(s)

Figure 2A:
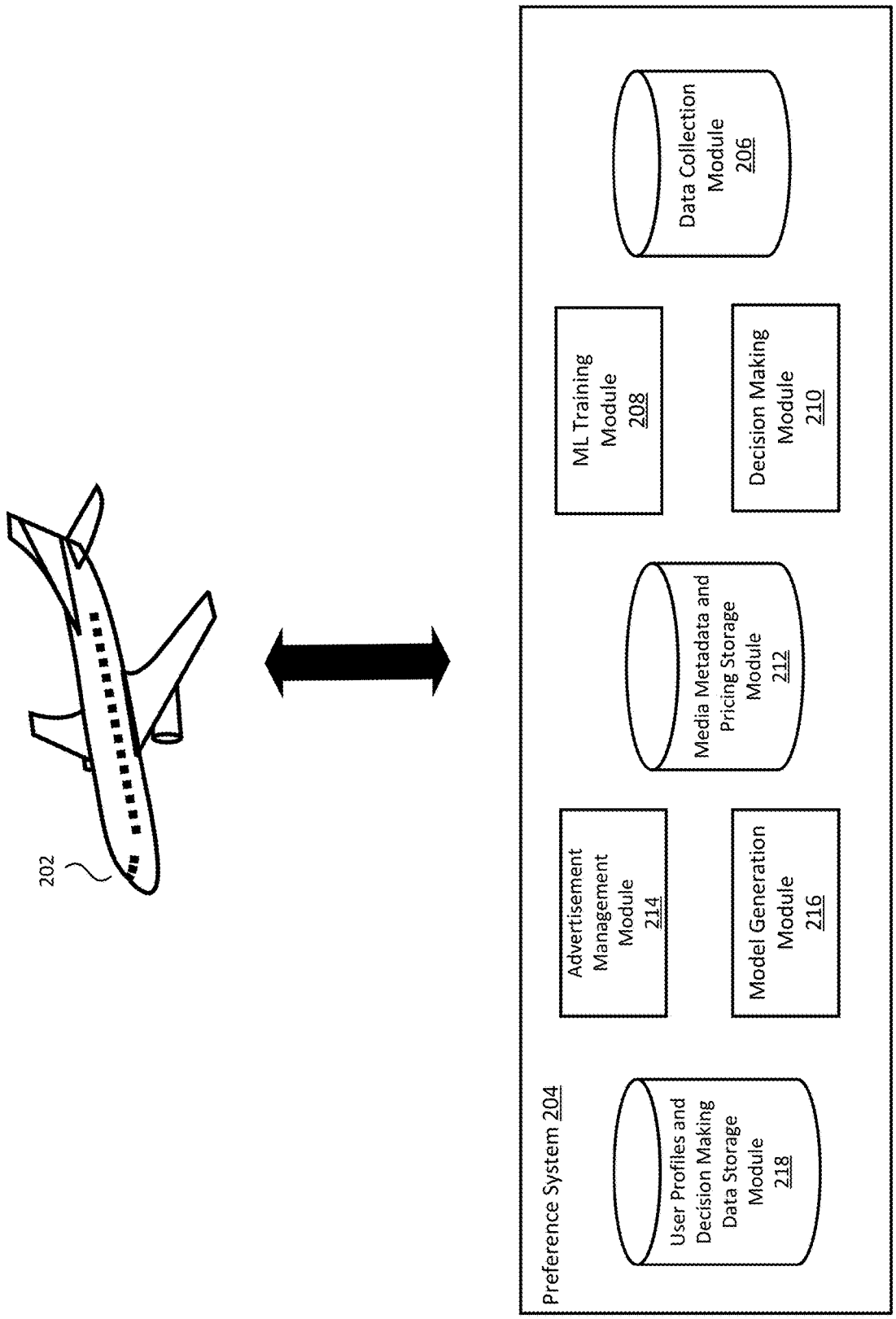
FIG. 2A shows an airplane interacting with an exemplary machine learning based preference system.

FIG. 2A shows an airplane 202 interacting with an exemplary machine learning based preference system 204. The components within preference system 204 are depicted merely as exemplary components. Thus, it should be understood that the preference system 204 can operate with more or fewer modules and that each module can interact with any other module of the preference system 204. Moreover, although FIG. 2 depicts preference system 204 as being external to the airplane 202 (e.g., such as a ground system), it should be understood that the preference system 204 can be on board a commercial vehicle such as airplane 202.

Data collection module 206, in some embodiments, obtains data indicative of a passenger's preferences. For instance, the data collection module 206 communicates with the seatback device on airplane 202 associated with a particular passenger to obtain the interactions of the passenger with the seatback device. The interactions can, for example, include that the passenger highly rated a video about currents global news. The seatback device (e.g., seatback devices 104 in FIG. 1) can communicate the rating to the data collection module 206 for storage.

The machine learning (ML) training module 208 communicates with the data collection module 206 to retrieve data that help the ML training module 208 train the preference system 204. The training can include using the data stored within the data collection module 206 to build models in order to make predictions or decision regarding the multimedia content to be displayed to a passenger. For example, the ML training module 208 can apply collaborative filtering techniques. Collaborative filtering is the process of filtering for information or patterns (e.g., multimedia content viewing preferences) using techniques involving collaboration among multiple sources. Collaborative techniques include, for example, user-based and item-based techniques. User-based techniques include finding users with similar patterns as the target user and item-based techniques include calculating a similarity between the items that target users rates and/or interacts with and other items.

For example, user-based techniques can include finding the similarity between a target user and other users based on the preferences obtained by data collection module 206. The target user can, for instance, be similar with other users inside a commercial vehicle because the parties prefer to watch sports-related advertisements. In some embodiments, the user-based techniques can include different weightages for similarities between users. In some cases, the ML training module 208 may determine that a target user is similar to some users and not similar to others. In this case, the users with which the target user has similarities, may be given more weightage. For instance, the ML training module 208 may give more weightage to the content viewed by these users, than the others. By giving the content more weight, the target user may be more likely to be presented content that these users have also viewed.

Item-based techniques can include finding similarities between two or more items of content (e.g., advertisements). For example, if a user views the entirety of an advertisements, the ML training module 208 can determine similar content to present to the user. This is unlike user-based techniques because the ML training module 208 need not assess the characteristics of the user; rather, the ML training module 208 assess the characteristics of the advertisement. For example, a user may view the entire advertisement for headphones. Subsequently, the ML training module 208 can look for other advertisements that have similar characteristics to the headphone advertisement. The characteristics can include, for example, subject matter, audio (e.g., music), and/or length.

The ML training module 208 can be training using, for example, neural networks, singular value decomposition (SVD), and/or matrix factorization (MF). By using matrix factorization, for instance, the ML training module 208 can decompose a user-item interaction matrix into the product of two lower dimensionally rectangular matrices. Matrix factorization can include several sub-techniques such as Funk MF, SVD++, asymmetric SVD, group-specific SVD, hybrid MF, and deep learning MF. The ML training module 208 can use one or more of these techniques to optimize the advertisement. Optimization can include, for example, instructing another module (e.g., advertisement management module 214) to transmit portions of an advertisement to the display of a user and/or skip, fast forward, and/or rewind advertisements being displayed to a user.

Further, there are several other techniques that are used to optimize (e.g., determine similar patterns between users) content. For example, Bayesian networks, clustering models, latent semantic models, probabilistic latent semantic models, multiple multiplicative factor models, latent Dirichlet allocation models, and Markov decision models. In an airplane setting, for example, there are a particular passenger that the ML training module 208 is working to determine preferences for. To do so, the data collection module 206 can send data of all the passengers on the airplane 202 to the ML training module 208. The ML training module 208 can then find a set of passengers whose patterns (e.g., ratings) are similar to the target passenger. Subsequently, the ML training module 208 can determine, based on the patterns of the set of passengers, multimedia content for the target passenger. To further elaborate, a target passenger may highly rate an advertisement for a beach front resort. The ML training module 208, upon receiving the rating information, can retrieve usage data of passenger that also highly rated the advertisement. Based on the usage data, the ML training module 208 can predict the preferences of the target passenger.

In some embodiments, the ML training module 208 can also use the collaborative filtering based approach to predict preferences when passengers skip viewing content. For example, a cosine similarity function can be used to fill-in values that are missing due to the passenger skipping content. An exemplary cosine similarity function is below:

$$\text{sim}(u, v) = \text{COS}(\vec{u}, \vec{v}) = \frac{\vec{u} \bullet \vec{v}}{\|\vec{u}\|_2 * \|\vec{v}\|_2} \quad (1)$$

The ML training module 208 can, in some cases, communicate with the decision making module 210. Alternatively or additionally, the decision making module 210 can communicate directly with the data collection module 206. For example, if the data collection module 206 contains a list of passenger preferences, as provided by a ground server, for example, the decision making module 210 can obtain the list. The decision making module 210 then determines the multimedia content to be displayed for the target passenger.

For example, the decision making module 210 can receive a preference prediction from the ML training module 208 and a list of multimedia content that is available on plane 202 from data collection module 206. The list of multimedia content can include classifiers for each multimedia content. The classifiers can be, for example, the genre, length, type (e.g., advertisement, movie), or another classifier. Similarly, the ML training module 208 can be trained classify a passenger's preferences with similar classifier. After obtaining the information, the decision making module 210 can, for example, match the classifiers to determine which multimedia content to display to the passenger.

In some embodiments, the media metadata and pricing storage module 212 can store data related the multimedia content available to the airplane 202. For instance, particular multimedia content can be available after the passenger has paid for it. In some embodiments, the media metadata and pricing storage module 212 can also communicate with the ML training module 208. For example, one of the classifiers can be a price classifier (e.g., expensive). ML training module 208 can account for the preference of the passenger to view multimedia content associate with a certain price (e.g., free, expensive).

The model generation module 216 can, in some cases, communicate with the ML training module 208 to obtain the training data. After which, the model generation module 216 can generate a training model, which can predict a passenger's preferences. Alternatively, the ML training module 208 and model generation module 208 can be part of a single module. The advertisement management module 214 can determine pricing and slots of advertisements during the presentation of the selected multimedia content. The advertisement management module 214 can be based on, for example, the OneMedia platform developed by Panasonic Avionics Corporation, headquartered in Lake Forest, Calif.

In some embodiments, the advertisement management module 214 can optimize the length and ratings of an advertisement based on how users interact with the advertisement. The interaction can include, for example, pausing, fast forwarding, rewinding, skipping, and/or viewing. In general, the advertisement management module 214 can optimize an advertisement in order to minimize advertisement space (e.g., length and space on screen) while also maximizing views. This concept is perhaps best described in reference to FIG. 2B.

Figure 2B:
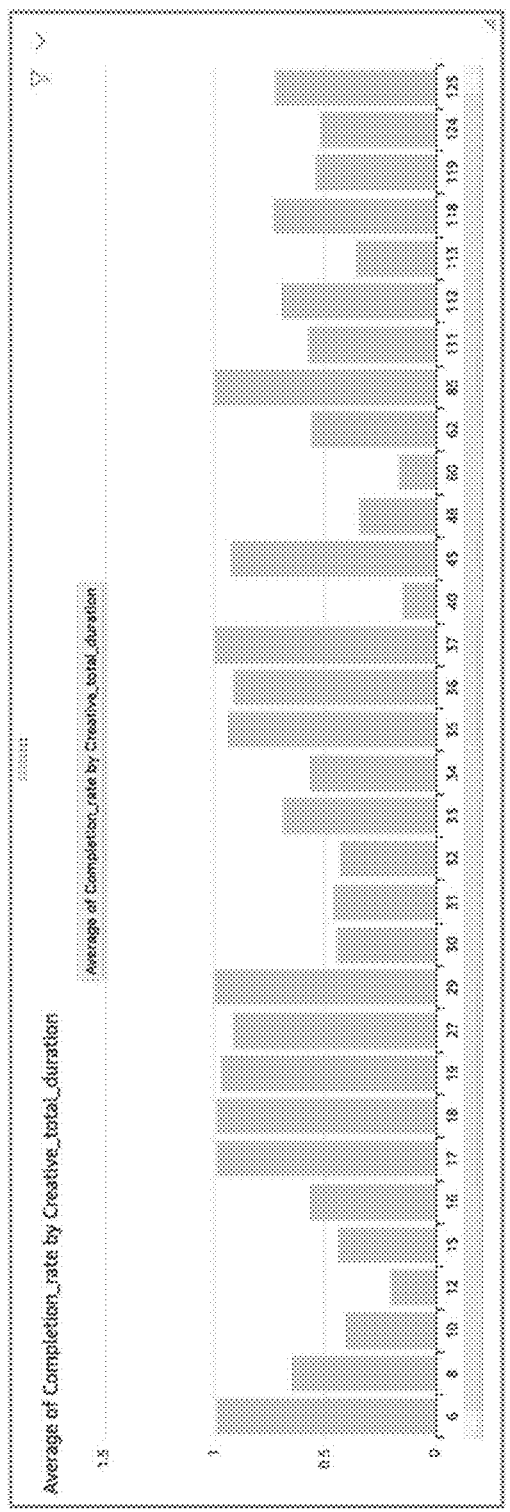
FIG. 2B depicts two exemplary techniques for optimizing an advertisement
Figure 2B:
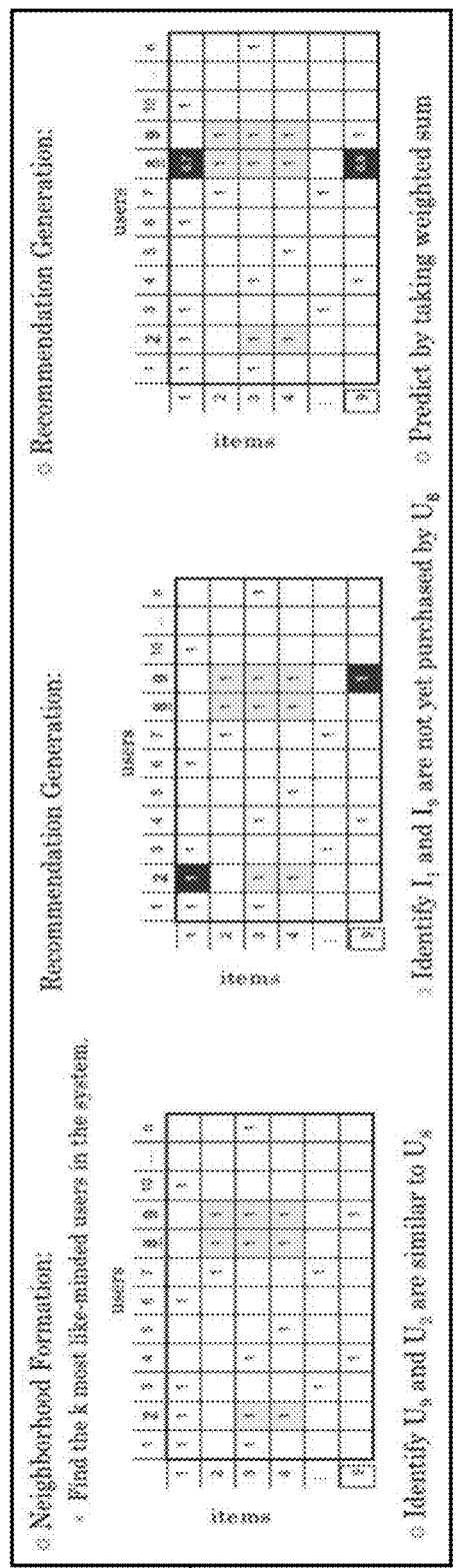

FIG. 2B depicts two exemplary techniques for optimizing an advertisement. Graph 220 depicts the relationship between the length of an advertisement and the completion rate. The x-axis of graph 220 is the length of an advertisement in minutes (referred to as "creative_total_duration" in FIG. 2B) and the y-axis is the completion rate (referred to as "Average of Completion_rate" in FIG. 2B), where 1 means the entirety of the advertisement was viewed. For example, when the advertisement is six minutes long, the completion rate is 1 and when the advertisement is twelve minutes long, the completion rate is approximately 0.25. Based on this information, the advertisement management module 214 can determine the optimal length of the advertisement (e.g. six minutes). In this case, an optimal advertisement is one that is completely viewed by the greatest number of users (e.g., passengers aboard a commercial vehicle).

A second technique is shown in approach 222. Approach 222 includes neighborhood formation, where the k most like minded users in the system are found. In some embodiments, the system can be an entire commercial passenger vehicle or a portion of the commercial passenger vehicle. A likeminded user can be a user which, for example, has similar preference or usage characteristics (e.g., similar completion rates or skipping of similar content). In approach 222, users $U_2$, $U_8$, and $U_9$ are found to be similar.

Subsequently, a recommendation is generated. Namely, the advertisement management module 214 can determine that items $I_1$ and $I_9$ are not yet purchased (or viewed) by $U_8$. Based on this determination, the advertisement management module 214 can predict the possibility of $U_8$ purchasing (or viewing) $I_1$ and $I_9$. The prediction can include taking the weighted sum based on, for example, the similarity between the items and/or the users. In this manner, the advertisement management module 214 can optimize advertisements.

Returning the FIG. 2A, the user profiles and decision making data storage module 218 can store the results of the preference system in a profile form. For example, the module 218 can develop profile for each passenger aboard the airplane 202. Thus, the decision module 210, for example, can refer to the profile of each user to determine new multimedia content to display.

Figure 3:
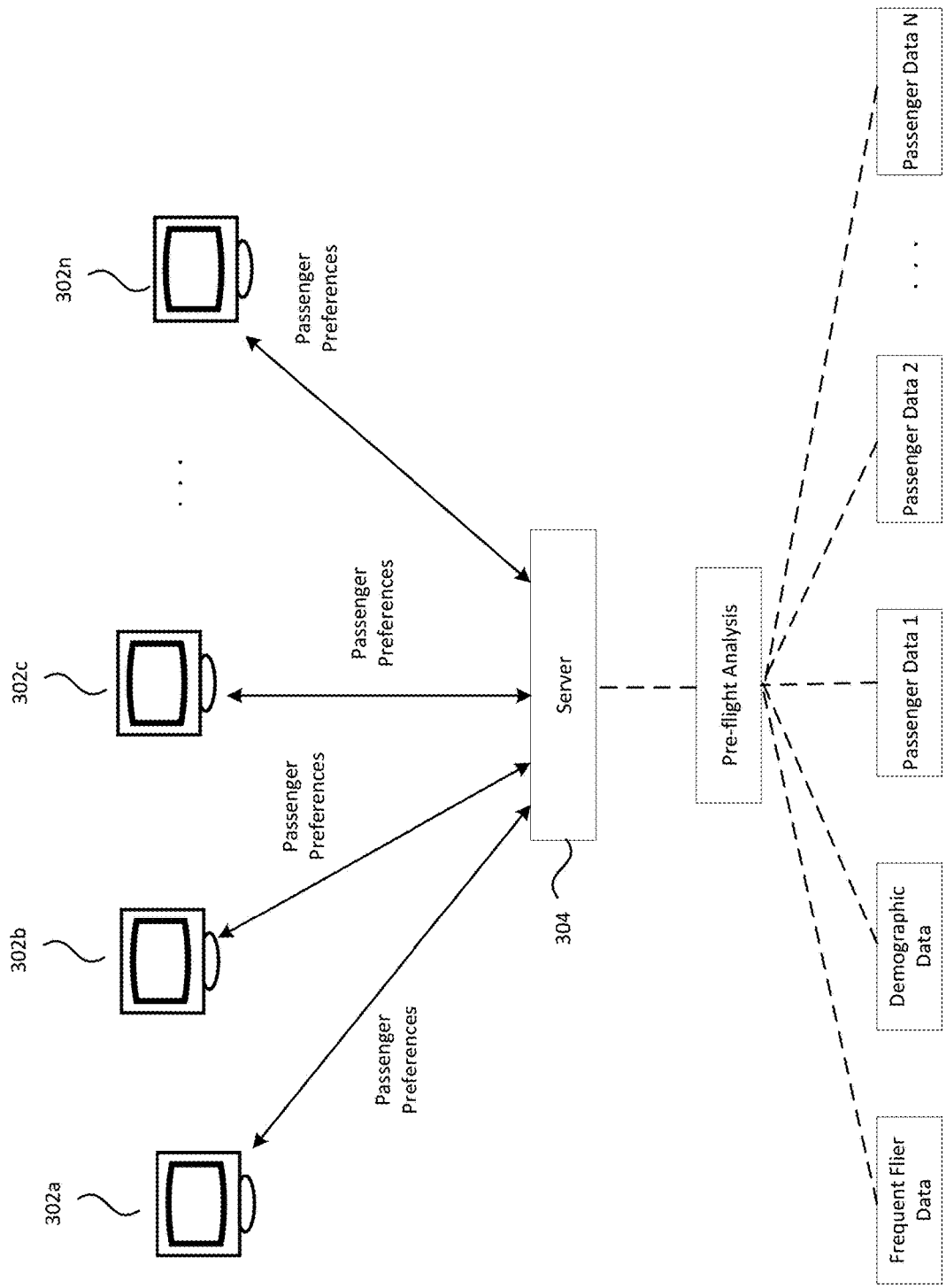
FIG. 3 shows multiple seat back monitors operating with a server.

FIG. 3 shows multiple seat back monitors 302a-n operating with a server 304. Each of the plurality of seat back monitors 302a-n communicate the passenger preferences with the server 304. In this context, server 304 can include the components of preference system 204. Further, the server 304 can be on board the commercial vehicle (e.g., airplane), and optionally, communicate with a ground server to do pre-flight analysis, as mentioned above. The pre-flight analysis can include analyzing passenger data such as frequent flier data, demographic information (e.g., age), and other data to generate a preference prediction for each passenger. The server 304 can use pre-flight analysis as a factor in performing the preference analysis during the flight, as mentioned in conjunction with FIG. 2.

For example, a particular passenger can be associates with monitor 302a aboard an airplane. Prior to taking off the server 304 may have performed pre-flight analysis for the particular passenger to determine their preferences. The pre-flight analysis may have included data of the frequent flier data. The frequent flier may indicate that the particular passenger routinely visits Hawaii. Based on this data, the server 304 can determine to display an advertisement for a beach front resort in Hawaii when the particular passenger initially boards the airplane.

Over time, as the particular passenger interacts with the monitor 302a, the server can glean more information regarding the particular passenger's preferences. For instance, the particular passenger can poorly rate the advertisement for a beach front resort in Hawaii. Due to the poor rating, the server 304 can adjust the previously determined preferences. The adjustments can be, for example, to no longer display Hawaii related content, advertisements, or beach related advertisements.

In some embodiments, the analysis can account for current seat passenger prior purchases and service requests recorded in a passenger electronic manifest including: geographical location and preferences; historical purchases including food, beverage, luxury items; prior travel; future travel; passenger status; airplane company passenger loyalty program likes and dislikes; type of travel; type of destination; length of flight to destination; flight destination location; information on aircraft flight patterns; an aircraft flight duration, or the like; and current passenger requests.

In some embodiments, the analysis required to determine a passenger's preferences can be done without placing a web cookie on the device associated with the passenger. Generally, a web cookie is a small piece of data stored on a person's computer to remember stateful information or the record the user's browsing data. Instead of placing web cookies, the analysis described herein can be performed based on interaction by the passenger with the seatback device or PED, or information gathered based on the passenger (e.g., frequent flier data). More specifically, the analysis described herein can be performed with duration centric tracking. For instance, for the duration of a flight.

Further, the analysis done for each seatback device (e.g., monitors 302a-n) can be cleared at the end of each passenger's travel. Thus, a subsequent passenger that uses a seatback device may not be presented with multimedia content based on the prior passenger's preferences. For example, when an airplane reaches a destination, the server 304 can be cleared of preference data.

Figure 4:
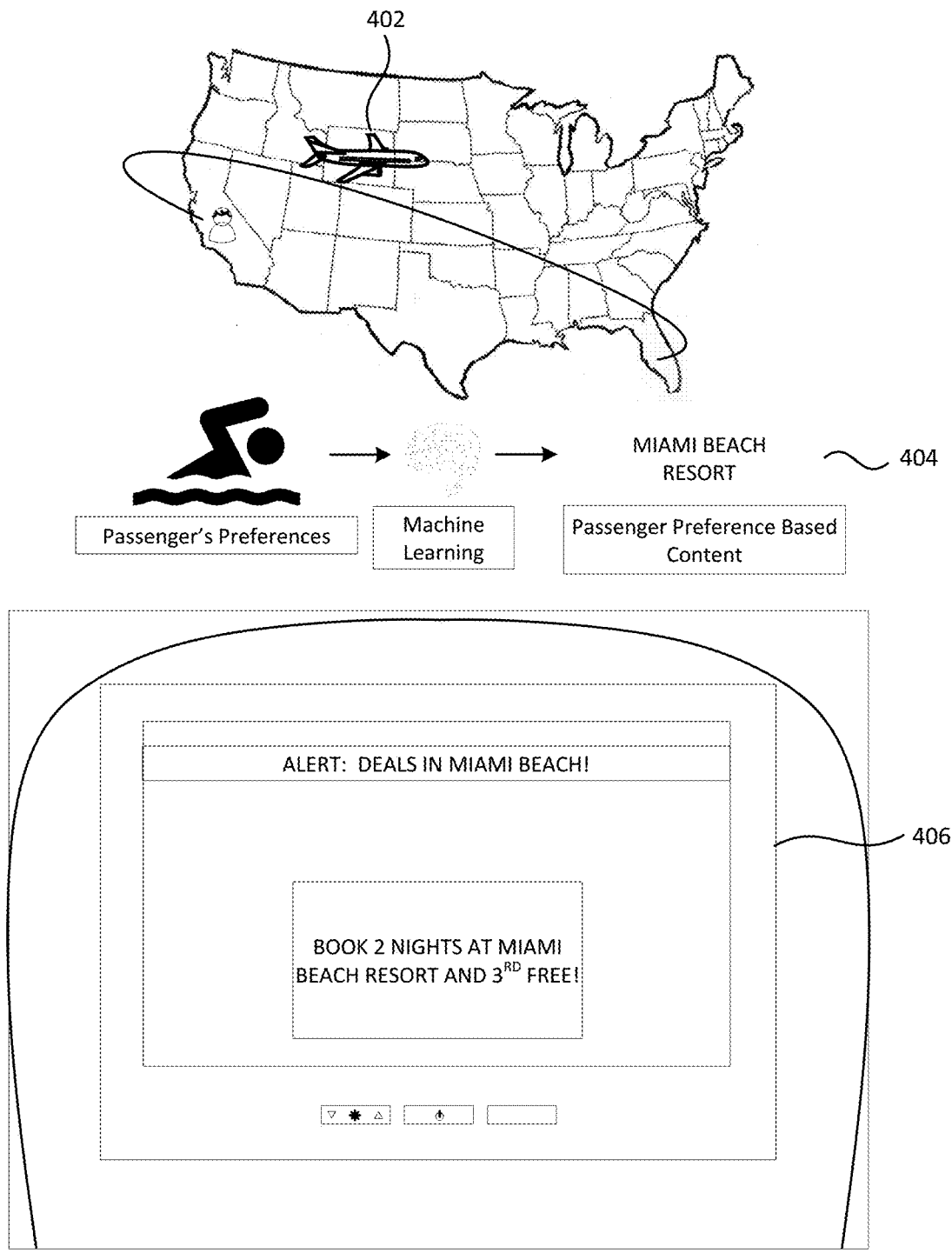
FIG. 4 shows an exemplary system for presenting passenger preference based content.

FIG. 4 shows an exemplary system for presenting passenger preference based content 406. Airplane 402 can be traveling from California to Florida. The passenger can have a preference for swimming. The preference can be determined based on for example, that the passenger has previously flown to beachfront location, highly rated videos regarding aquatic sports, the destination, or the like. The machine learning algorithms can use the data (e.g., pre-flight analysis and onboard interactions) to determine that an advertisement 404 for a Miami Beach Resort aligns the passenger's interests. As such, the seatback display associated with the passenger, can display the advertisement for Miami.

Figure 5A:
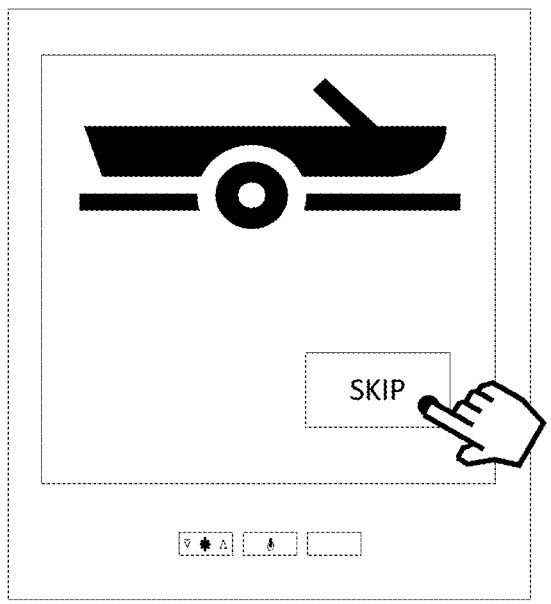
FIGS. 5A-B show two exemplary actions from a passenger to indicate a preference.
Figure 5B:
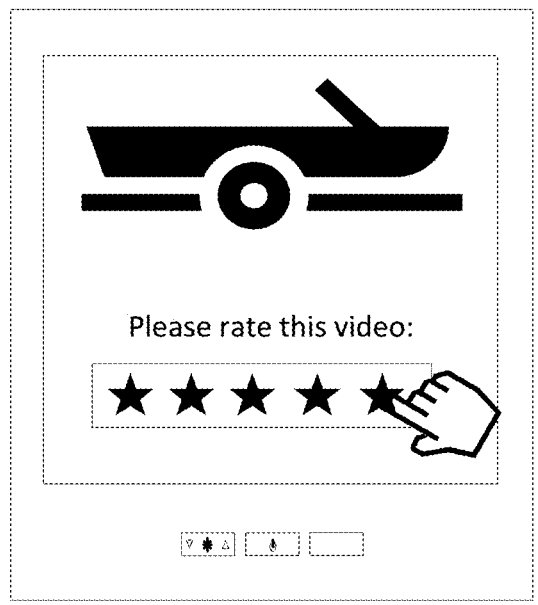

FIGS. 5A-B shows two exemplary actions from a passenger to indicate a preference. In particular, FIG. 5A depicts a skip feature 502 and FIG. 5B depicts a rating system 504. In FIG. 5A, a server, for example, can send commands for the seatback monitor to display a skip option. The commands can include, for example, when the skip feature should be display, for long it should be displayed, or where on the monitor it should be displayed. As mentioned above, if the passenger elects to skip viewing the multimedia content, the server can infer that the preferences for the passenger should indicate a dislike towards the content being currently displayed.

Similarly, the rating feature in FIG. 5B can be depicted at various times, locations on the monitors, and can include multiple types of graphics. For example, as depicted in FIG. 5B, a star rating system is displayed, where selecting 5-stars indicates that the passenger liked the content, whereas a 1-start would indicate dislike. In some embodiments, the skip feature can be used while the content is being displayed and the rating system can be displayed after the content is finished playing. For example, a five minute may be playing, and the skip feature may be displayed for the first thirty seconds and the rating system may be display at the end of the five minutes. Alternatively or additionally, the rating system may be displayed after the passenger presses the skip option. Although FIG. 5A-B depict two options as ways the passenger can interact to indicate preferences, other options are also possible.

Exemplary Methodology

Figure 6:
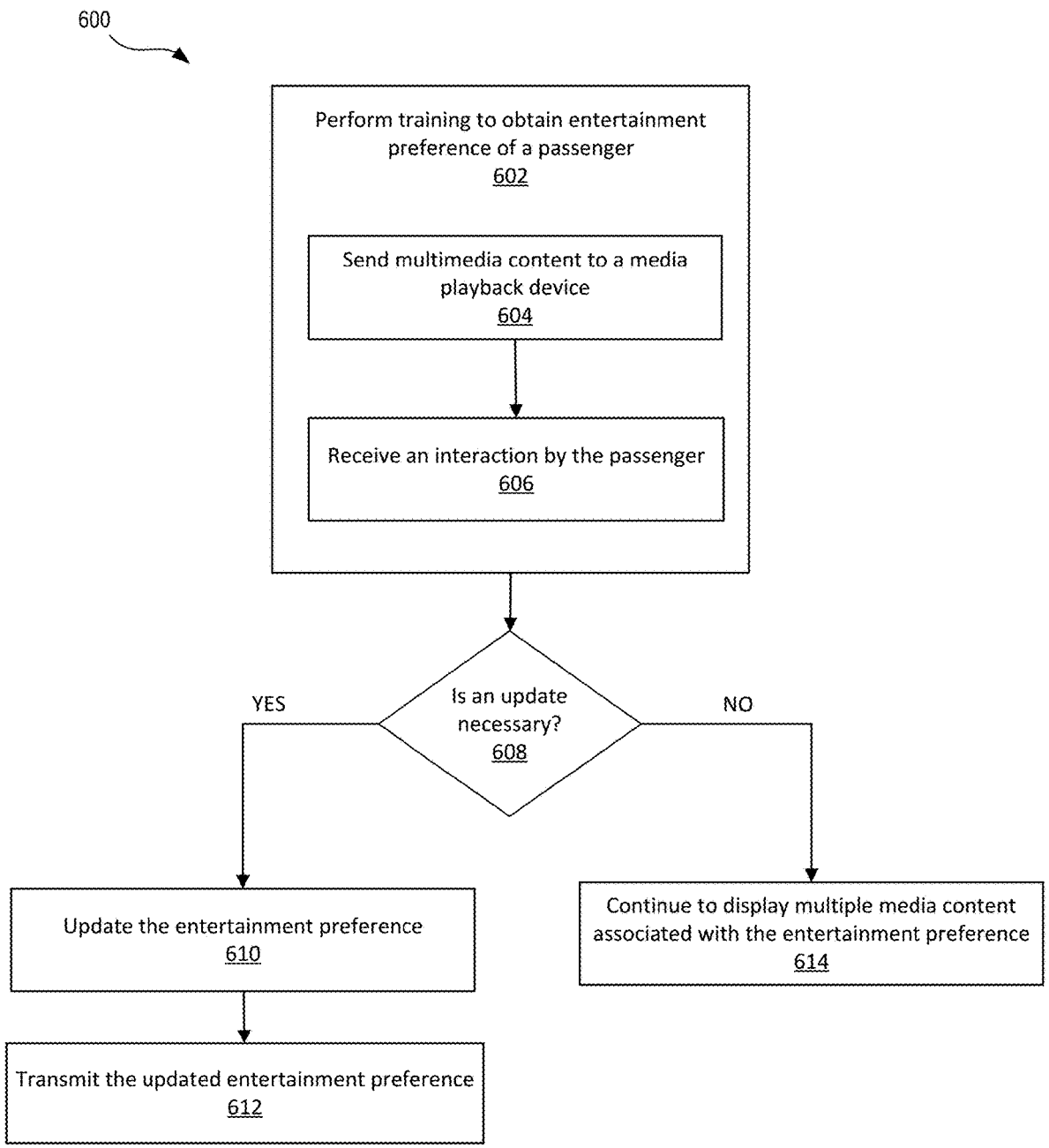
FIG. 6 shows an exemplary flowchart of a method for delivering passenger preference based content in a commercial passenger vehicle.

FIG. 6 shows an exemplary flowchart 600 of a method for delivering passenger preference based content in a commercial passenger vehicle. The method can be implemented by a server on board a commercial passenger vehicle. In some embodiments, the method can be implemented by a processor onboard a commercial passenger vehicle, where the processor executed instructions stored in memory (e.g., non-transitory computer-readable medium) on board the commercial passenger vehicle. For example, the method can be implemented by a mobile device that belongs to a passenger or a seatback monitor, which is located on ahead rest facing the passenger. Further, the method can be implemented on a device that is collocated with a plurality of other devices (e.g., on an airplane).

At block 602, the method includes performing training to obtain an entertainment preference of at least one passenger of the commercial vehicle. The training can be completed during a first portion of a predetermined nominal duration (e.g., length of a flight). Further, the training can help determine a duration of the multimedia content. In some cases, the duration can be less than a portion of the predetermined nominal duration.

For example, the algorithm optimizes advertisement length, advertisement position/timing during the flight and generates "value" advertisement time segment pricing (e.g., advertisement slots, A, B, C, D). For example, Slot A can be 7 seconds in duration for a Company D for Hotels at a beginning of a flight, Slot B can 5 seconds in duration for Liquor Company A at 20 minutes after take-off and during beginning of Comedy Movie A, Slot C can 10 seconds in duration for a Rental Car Company after drink/food service and during the middle of Western Movie B, and Slot D can be 9 seconds long for a Ride Share Company 20 minutes before landing and at the ending of Drama Television Program C.

The training can include, at block 604, sending, to a media playback device associated with the passenger and on board the vehicle, a multimedia content. In some embodiments, the method further includes tracking the multimedia content being displayed on the media playback device and applying machine learning algorithms (e.g., collaborative filtering) to develop a trained model. The trained model can be operable to determine a similarity between the multimedia content and the entertainment preference of the passenger.

Alternatively or additionally, the entertainment preference of the passenger can be based on, for example, (1) social analytics or press releases; (2) an interaction of the at least one passenger with social media content and/or the multimedia content; (3) an origin and/or destination of the commercial passenger vehicle; and/or (4) the predetermined nominal duration.

At block 606, the method includes receiving an interaction by the passenger on the multimedia content. The interaction can be, for example, skipping portions of the multimedia content or rate the multimedia content. The method can further include prompting the passenger to rate the multimedia content being displayed on the media playback device. Another factor can be performing a plurality of trainings to obtains the entertainment preferences of the other passengers on board the vehicle and collocated with the passenger.

Based on the interaction and trained, the method includes determined whether the entertainment preference needs to be updated, at block 608. For example, if the trained model indicates that there is a similarity between the multimedia content and the entertainment preference, then the multimedia content can be continued to be displayed. If, however, there isn't a similarity, an update to entertainment preference can be performed, at block 610. Similarly, if the passenger highly rates the multimedia content, then an update may not necessary. If the rating is low, then an update can be performed.

Updating the entertainment preference can include, for example, applying item-based and/or user-based techniques. In some embodiments, updating the entertainment preference can include determining, by the server, one or more passengers onboard the commercial passenger vehicle with entertainment preferences similar to the at least one passenger; identifying, by the server, other multimedia content which has not been displayed by the media playback device and has been viewed by the one or more passengers; and determining, by the server, a probability of the at least one passenger viewing the other multimedia content.

If an update is performed, the updated entertainment preference can be transmitted to, for example, the on board server. If an update is not performed, the multimedia content associated with the entertainment preference can continue to be displayed. In some embodiments, at the end of the predetermined nominal duration, the entertainment preference of the passenger can be deleting from the server and/or device on board the vehicle.

Exemplary Computing System

Figure 7:
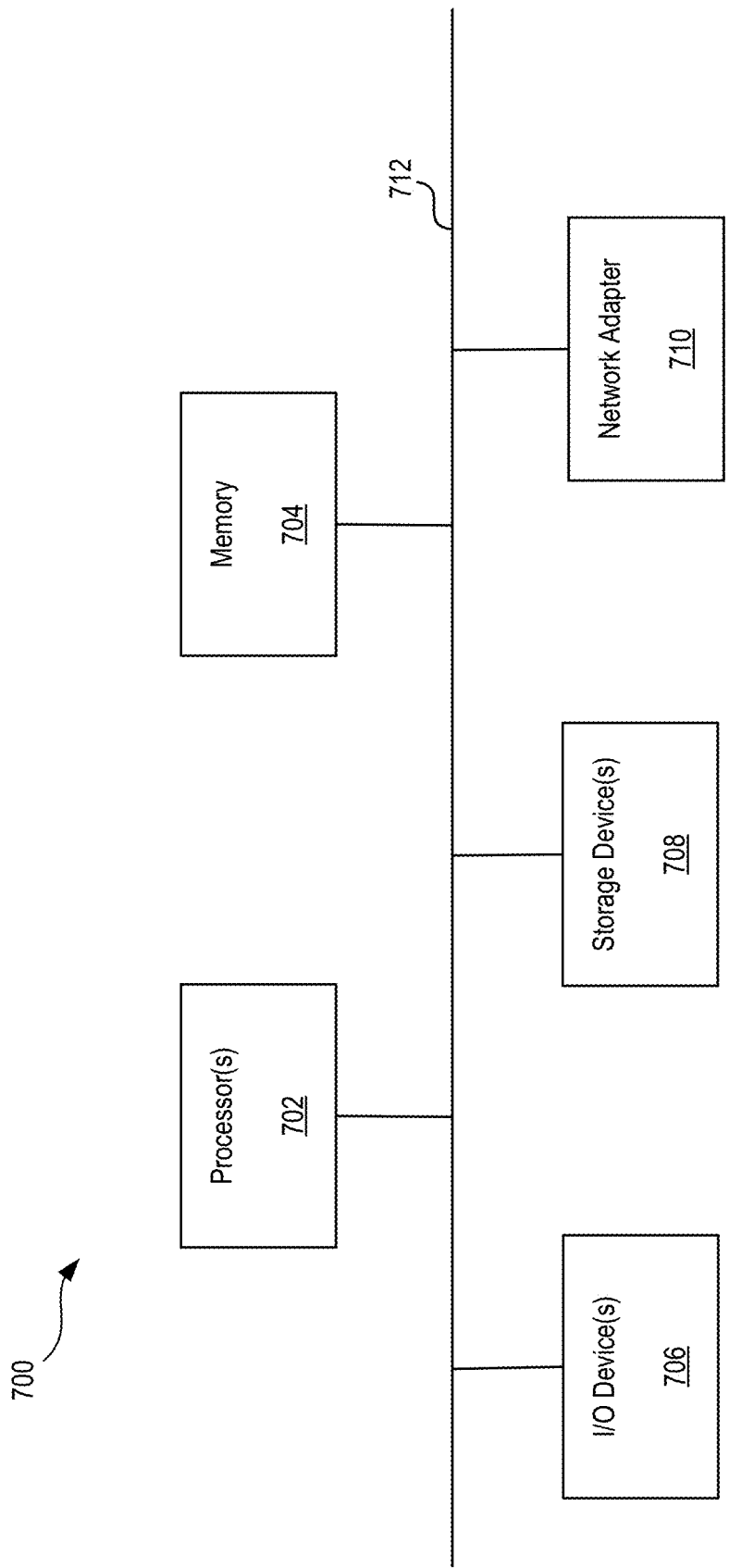
FIG. 7 shows an overview of a system for providing passenger preference based content on a commercial passenger vehicle.

FIG. 7 is a block diagram illustrating a diagrammatic representation of a machine in the example form of a computer system operable to perform aspects of the disclosed technology. The computing system 700 may be seatback device, a PED, a server computer, a client computer, a personal computer (PC), a user device, a tablet PC, a laptop computer, a personal digital assistant (PDA), a cellular telephone, an iPhone, an iPad, a Blackberry, a processor, a telephone, a web appliance, a network router, switch or bridge, a console, a handheld console, a (handheld) gaming device, a music player, any portable, mobile, handheld device, wearable device, or any machine capable of executing a set of instructions, sequential or otherwise, that specify actions to be taken by that machine.

The computing system 700 may include one or more central processing units ("processors") 702, memory 704, input/output devices 706 (e.g., keyboard and pointing devices, touch devices, display devices), storage devices 708 (e.g., disk drives), and network adapters 710 (e.g., network interfaces) that are each connected to an interconnect 712. The interconnect 712 is illustrated as an abstraction that represents any one or more separate physical buses, point to point connections, or both connected by appropriate bridges, adapters, or controllers. The interconnect 712, therefore, may include, for example, a system bus, a peripheral component interconnect (PCI) bus or PCI-Express bus, a Hyper-Transport or industry standard architecture (ISA) bus, a small computer system interface (SCSI) bus, a universal serial bus (USB), IIC (I2C) bus, or an Institute of Electrical and Electronics Engineers (IEEE) standard 1394 bus (e.g., Firewire).

The memory 704 and storage devices 708 are computer-readable storage media that may store instructions that implement at least portions of the various embodiments. In addition, the data structures and message structures may be stored or transmitted via a data transmission medium (e.g., a signal on a communications link). Various communications links may be used (e.g., the Internet, a local area network, a wide area network, or a point-to-point dial-up connection). Thus, computer readable media can include computer readable storage media (e.g., non-transitory media) and computer readable transmission media.

The instructions stored in memory 704 can be implemented as software and/or firmware to program the processor 702 to carry out actions described above. In some embodiments, such software or firmware may be initially provided to the computing system 700 by downloading it from a remote system through the computing system 700 (e.g., via network adapter 710).

The various embodiments introduced herein can be implemented by, for example, programmable circuitry (e.g., one or more microprocessors, programmed with software and/or firmware), or entirely in special-purpose hardwired circuitry (e.g., non-programmable circuitry), or in a combination of such forms. Special-purpose hardwired circuitry may be in the form of, for example, one or more application-specific integrated circuits (ASICs), programmable logic devices (PLDs), field-programmable gate array (FPGAs), etc.

CONCLUSION

The embodiments set forth herein represent the necessary information to enable those skilled in the art to practice the embodiments and illustrate the best mode of practicing the embodiments. Upon reading the description in light of the accompanying figures, those skilled in the art will understand the concepts of the disclosure and will recognize applications of these concepts that are not particularly addressed herein. These concepts and applications fall within the scope of the disclosure and the accompanying claims.

The above description and drawings are illustrative and are not to be construed as limiting. Numerous specific details are described to provide a thorough understanding of the disclosure. However, in certain instances, well-known details are not described in order to avoid obscuring the description. Further, various modifications may be made without deviating from the scope of the embodiments.

As used herein, unless specifically stated otherwise, terms such as "processing," "computing," "calculating," "determining," "displaying," "generating," or the like, refer to actions and processes of a computer or similar electronic computing device that manipulates and transforms data represented as physical (electronic) quantities within the computer's memory or registers into other data similarly represented as physical quantities within the computer's memory, registers, or other such storage medium, transmission, or display devices.

Reference herein to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not for other embodiments.

The terms used in this specification generally have their ordinary meanings in the art, within the context of the disclosure, and in the specific context where each term is used. Certain terms that are used to describe the disclosure are discussed above, or elsewhere in the specification, to provide additional guidance to the practitioner regarding the description of the disclosure. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that the same thing can be said in more than one way.

Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any term discussed herein is illustrative only and is not intended to further limit the scope and meaning of the disclosure or of any exemplified term. Likewise, the disclosure is not limited to various embodiments given in this specification.

Without intent to further limit the scope of the disclosure, examples of instruments, apparatus, methods and their related results according to the embodiments of the present disclosure are given above. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions will control.

From the foregoing, it will be appreciated that specific embodiments of the invention have been described herein for purposes of illustration, but that various modifications may be made without deviating from the scope of the invention. Accordingly, the invention is not limited except as by the appended claims.

From the foregoing, it will be appreciated that specific embodiments of the invention have been described herein for purposes of illustration, but that various modifications may be made without deviating from the scope of the invention. Accordingly, the invention is not limited except as by the appended claims.

What is claimed is:

1. A method of processing data, the method comprising:
performing, by a server on a commercial passenger vehicle, in a first portion of a predetermined nominal duration, a training to obtain an entertainment preference of at least one passenger, wherein performing the training further comprises:
sending, by the server, to a media playback device associated with the at least one passenger and on board the commercial passenger vehicle, a multimedia content; and
in response to the media playback device displaying at least a portion of the multimedia content during a second portion of the predetermined nominal duration, receiving, by the server, from the media playback device, an interaction by the at least one passenger on the multimedia content,
wherein the performing the training and receiving the interaction are performed with duration centric tracking of the media playback device; and
updating, by the server, based on the received interaction, the entertainment preference for the at least one passenger to obtain an updated entertainment preference;
wherein updating the entertainment preference further comprises:
determining, by the server, one or more passengers onboard the commercial passenger vehicle with entertainment preferences similar to the at least one passenger;
identifying, by the server, other multimedia content which has not been displayed by the media playback device and has been viewed by the one or more passengers; and
determining, by the server, a probability of the at least one passenger viewing the other multimedia content.

2. The method of claim 1, wherein performing the training further comprises:

tracking the multimedia content being displayed on the media playback device;

applying machine learning algorithms to develop a trained model, wherein the trained model is operable to determine a similarity between the multimedia content and the entertainment preference; and in response to determining the similarity between the multimedia content and the entertainment preference, determining whether to update the entertainment preference or continue to send multimedia content associated with the entertainment preference to the media playback device.

3. The method of claim 1, further comprising:

prompting, by the server, the at least one passenger, to rate the multimedia content being displayed on the media playback device;

determining, by the server, based on the rating, whether the multimedia content is indicative of the entertainment preference; and in response to determining whether the multimedia content is indicative of the entertainment preference, determining whether to update, by the server, the entertainment preference or to continue, by the server, to send multimedia content associated with the entertainment preference to the media playback device.

4. The method of claim 1, wherein updating the entertainment preference further comprises:

applying item-based and/or user-based techniques.

5. The method of claim 1, wherein the entertainment preference includes a length of the multimedia content.

6. The method of claim 1, wherein the predetermined nominal duration is based on a scheduled flight time of an airplane.

7. The method of claim 1, further comprising:

deleting, by the server, at an end of the predetermined nominal duration, the updated entertainment preference for the at least one passenger.

8. The method of claim 1, wherein the entertainment preference of the at least one passenger is obtained based on any of: (1) social analytics or press releases; (2) an interaction of the at least one passenger with social media content and/or the multimedia content; (3) an origin and/or destination of the commercial passenger vehicle; and/or (4) the predetermined nominal duration.

9. The method of claim 1, wherein the interaction is based on any of whether the at least one passenger fast forwards and/or rewinds over portions of the multimedia content, and/or a rating the at least one passenger gives the multimedia content.

10. The method of claim 1, wherein the entertainment preference is obtained from performing a plurality of trainings to obtain a plurality of entertainment preferences of a plurality of passengers, wherein the plurality of passengers is collocated with each other and the at least one passenger.

11. A system implemented on a commercial passenger vehicle, the system comprising:

a processor located in the commercial passenger vehicle; and a memory located in the passenger commercial vehicle, the memory having instructions stored thereon that, when executed by the processor, cause the processor to:

perform, in a first portion of a predetermined nominal duration, a training to obtain an entertainment preference of at least one passenger, wherein performing the training further comprises:

sending, to a media playback device associated with the at least one passenger and on board the commercial passenger vehicle, a multimedia content;

in response to the media playback device displaying at least a portion of the multimedia content during a second portion of the predetermined nominal duration, receive, from the media playback device, an interaction by the at least one passenger on the multimedia content, wherein the performing the training and receiving the interaction are perform with duration centric tracking of the media playback device; and update, based on the received interaction, the entertainment preference for the at least one passenger to obtain an updated entertainment preference; and transmit the updated entertainment preference for the at least one passenger to the memory;

wherein the instructions further cause the processor to:

determine one or more passengers onboard the commercial passenger vehicle with entertainment preferences similar to the at least one passenger;

identify other multimedia content which has not been displayed by the media playback device and has been viewed by the one or more passengers; and determine a probability of the at least one passenger viewing the other multimedia content.

12. The system of claim 11, wherein the media playback device is a mobile device that belongs to the at least one passenger, or wherein the media playback device is located behind a head rest of a seat in the commercial passenger vehicle which is facing the at least one passenger.

13. The system of claim 11, wherein the media playback device is collocated with a plurality of media playback devices, and wherein the entertainment preference is obtained by performing a plurality of trainings to obtain a plurality of entertainment preferences of a plurality of passengers associated with the plurality of media playback devices.

14. The system of claim 11, wherein the instructions further cause the processor to:

apply machine learning algorithms to develop a trained model, wherein the trained model is operable to determine a similarity between the multimedia content and the entertainment preference.

15. The system of claim 11, wherein the entertainment preference of the at least one passenger is obtained based on any of (1) social analytics or press releases; (2) an interaction of the at least one passenger with social media content; (3) an origin and/or destination of the commercial passenger vehicle; and/or (4) the predetermined nominal duration.

16. A non-transitory computer-readable medium containing instructions, execution of which in a computer system on board a commercial passenger vehicle causes the computer system to:

perform, in a first portion of a predetermined nominal duration, a training to obtain an entertainment preference of at least one passenger, wherein performing the training further comprises:

sending, to a media playback device in the commercial passenger vehicle and associated with the at least one passenger, a multimedia content;

in response to the media playback device displaying at least a portion of the multimedia content during a second portion of the predetermined nominal duration, receive, from the media playback device, an interaction by the at least one passenger on the multimedia content,
    wherein the performing the training and receiving the interaction are perform with duration centric tracking of the media playback device; and
update, based on the received interaction, the entertainment preference for the at least one passenger to obtain an updated entertainment preference; and
transmit the updated entertainment preference for the at least one passenger to a server, wherein the server is on board the commercial passenger vehicle;
wherein the entertainment preference is updated by:
determining, by the computer system, one or more passengers onboard the commercial passenger vehicle with entertainment preferences similar to the at least one passenger;
identifying, by the computer system, other multimedia content which has not been displayed by the media playback device and has been viewed by the one or more passengers; and
determining, by the computer system, a probability of the at least one passenger viewing the other multimedia content.

17. The non-transitory computer readable medium of claim 16, wherein performing the training further comprises:
    applying machine learning algorithms to develop a trained model, wherein the trained model is operable to determine a similarity between the multimedia content and the entertainment preference.

18. The non-transitory computer readable medium of claim 16, wherein the media playback device is collocated with a plurality of media playback devices, and wherein the entertainment preference is obtained by performing a plurality of trainings to obtain a plurality of entertainment preferences of a plurality of passengers associated with the plurality of media playback devices.

19. The non-transitory computer readable medium of claim 16, wherein the entertainment preference is updated by applying item-based and/or user-based techniques.

20. The non-transitory computer readable medium of claim 16, wherein the instructions include instructions causing the computer system to delete, at an end of the predetermined nominal duration, the updated entertainment preference for the at least one passenger.

\* \* \* \* \*